United States Patent [19]

Shiraki et al.

[11] Patent Number: 4,645,328
[45] Date of Patent: Feb. 24, 1987

[54] APPARATUS FOR SCANNING AN ORIGINAL

[75] Inventors: Kenhachi Shiraki; Shinichi Kikkawa; Takaharu Izawa; Yoshifumi Miyazaki; Torahiko Nonoue; Etsuzo Moriki, all of Hyogo, Japan

[73] Assignee: Sanyo Electric Co., Ltd, Japan

[21] Appl. No.: 693,867

[22] Filed: Jan. 23, 1985

[30] Foreign Application Priority Data

Jul. 18, 1984 [JP] Japan ................................. 59-149917
Jul. 18, 1984 [JP] Japan ................................. 59-149918

[51] Int. Cl.⁴ .......................................... G03G 15/00
[52] U.S. Cl. ..................................... 355/8; 355/3 R; 355/14 R
[58] Field of Search ................... 355/3 R, 14 R, 8, 68, 355/51

[56] References Cited

U.S. PATENT DOCUMENTS 4,303,332 12/1981 Sakai ................................. 355/14 R
4,324,485 4/1982 Asakura et al. .......................... 355/8
4,338,020 7/1982 Yukawa et al. ..................... 355/8 X
4,379,631 4/1983 Kitamura ............................. 355/8 X
4,422,756 12/1983 Abe et al. ............................ 355/8 X
4,511,246 4/1985 Nishiyama ................. 355/14 SH X
4,519,702 5/1985 Shigemura et al. ................ 355/8 X Primary Examiner—A. C. Prescott
Attorney, Agent, or Firm—Darby & Darby

[57] ABSTRACT

An apparatus for scanning an original includes a light source which is supported by a carriage movable in a scanning direction. A shield member is formed on the carriage. A first photointerrupter is provided at a home position of the carriage and a second photointerrupter is provided to a moving direction therefrom. When a forward going of the carriage is started from the home position and continued by a distance corresponding to the size of paper and/or the copy magnification, the light source is turned off and the carriage starts a returning movement. During the returning movement, the carriage travels further as far as the prescribed distance after the second photointerrupter being shielded by the shield member, thereafter a braking is applied on the carriage. The prescribed distance may be changed in accordance with the paper size or the copy magnification, accordingly the larger the returning speed of the carriage, the shorter the prescribed distance described above and longer the braking distance, which will be reduced with the increased returning speed.

7 Claims, 7 Drawing Figures

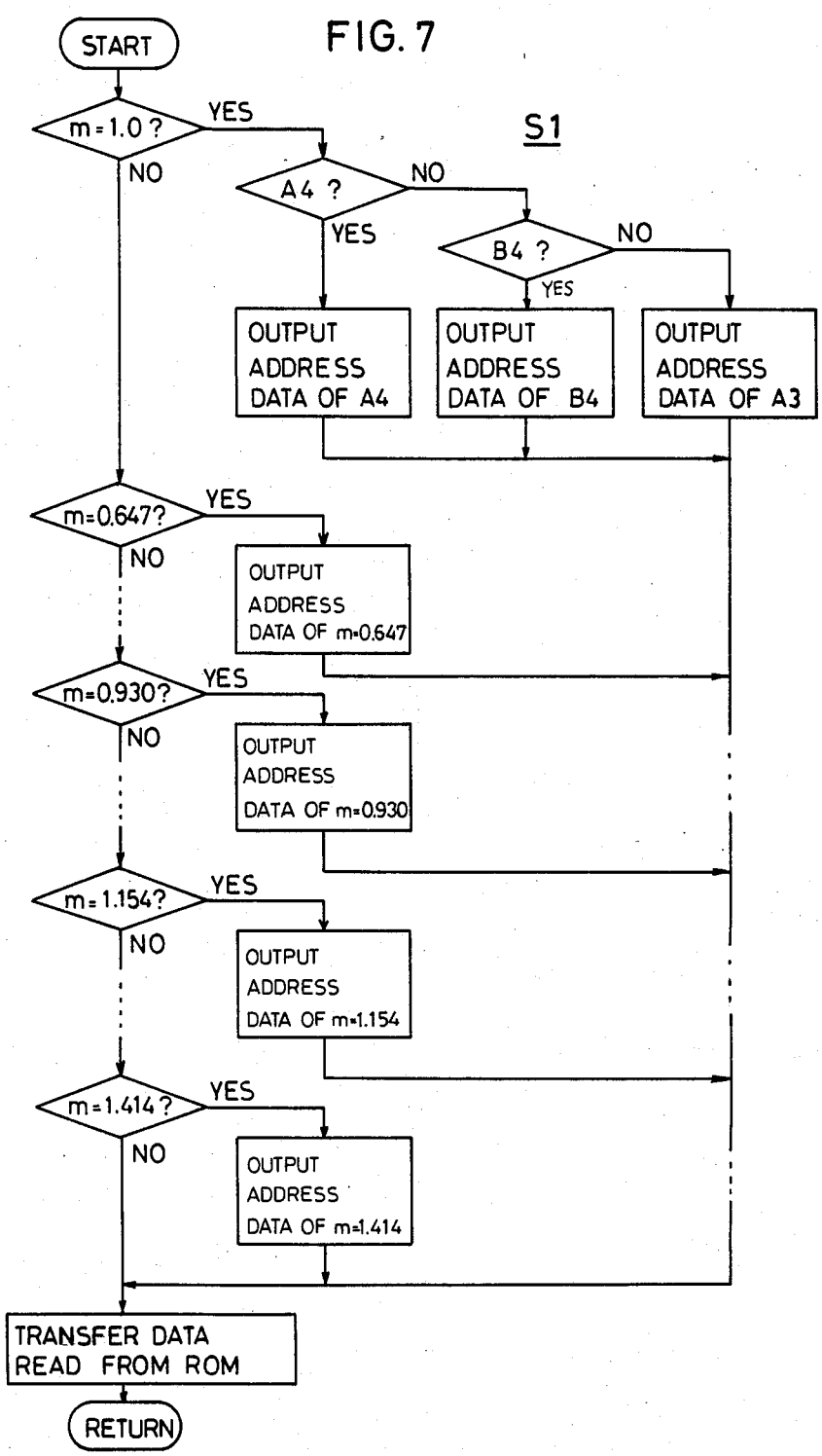

APPARATUS FOR SCANNING AN ORIGINAL

BACKGROUND OF THE INVENTION

1. Field of the Invention

The present invention relates to an apparatus for scanning an original. More specifically, the present invention relates to an apparatus for scanning an original in which an original table with the original being placed thereupon and a light source for exposing the original are moved relatively whereby the original is scanned and exposed by the light source.

2. Description of the Prior Arts

In order to scan and expose the original, an apparatus for scanning an original which moves back and forth a movable member disposed in relation with the original table or the light source is known. On the other hand, an apparatus for scanning an original which changes the returning speed thereof according to the size of copy is also known. In these apparatus the returning speed of the movable member is set to increase with the paper size and/or the copy magnification. However, if a braking position of the movable member during the returning movement is constant regardless of the returning speed thereof, it may cause a following inconvenience. More specifically, if the distance between braking start position and standstill position is short, in the case where the scanning and exposing means or the movable member returns in a high speed, an excessive impact and vibration may occur on the stop. On the contrary, if the distance between braking and standstill positions is long and when the returning speed is slow, a time necessary for the standstill increases and the copying efficiency will deteriorate.

In the past, no effective means whatever has been proposed to solve such problems.

SUMMARY OF THE INVENTION

Therefore, it is a principal object of the present invention to provide a novel apparatus for scanning an original.

It is another object of the present invention to provide an apparatus for scanning an original which enables the change of braking distance in accordance with the returning speed of a scanning and exposing means, namely a movable member.

It is still another object of the present invention to provide an apparatus for scanning an original whereby the impact and vibration are controllable even at the high returning speed and the deterioration of copying efficiency may be restrained even at the slow returning speed.

It is another object of the present invention to provide an apparatus for scanning an original having a simple configuration.

In brief, the present invention is an apparatus for scanning an original which includes a movable member disposed in relation with an original table or a light source for exposure, a detecting means provided on the moving path of the movable member, a means for returning the movable member further by the prescribed distance after being detected by the detecting means during the returning movement and a means for braking the movable member after the completion of return by the prescribed distance.

According to the present invention, a timing for applying the braking can be changed in accordance with the returning speed of the scanning and exposing means, i.e. the movable member. Accordingly, when the returning speed of the movable member is high, an occurrence of impact and vibration can be restrained by reducing the prescribed distance and increasing the braking distance. Whereby, a long life of equipment, for example, such as the electrophotographic copying machine may be anticipated. When the returning speed is slow, a copying efficiency can be improved by reducing the returning time by increasing the prescribed distance and shorten the braking distance. That is, according to the present invention problems described above which may be said as an antinomy or ambivalence can be solved successfully.

In a preferred embodiment of the present invention, the detecting means is disposed at the starting position of the original exposure in the vicinity of the home position of the movable member. The timing when the movable member is detected by the detecting means during the returning movement is deemed as the base for continuing the prescribed distance described above. According to the preferred embodiment of the present invention, a configuration with a fewer number of detecting means, reduced number of components and simplified wiring works is attainable and the reduction of cost of the apparatus for scanning an original, that is to say an electrophotographic copying machine or the like which makes use thereof may be achieved.

These and other objects, advantages, aspects and features of the present invention will become more apparent from the following detailed description when taken in connection with the accompanying drawings.

BRIEF DESCRIPTION OF THE DRAWINGS

FIG. 7 is a flow diagram showing a subroutine for reading the ROM data and setting the data in a prescribed area of the RAM.

DESCRIPTION OF THE PREFERRED EMBODIMENTS

Figure 1:
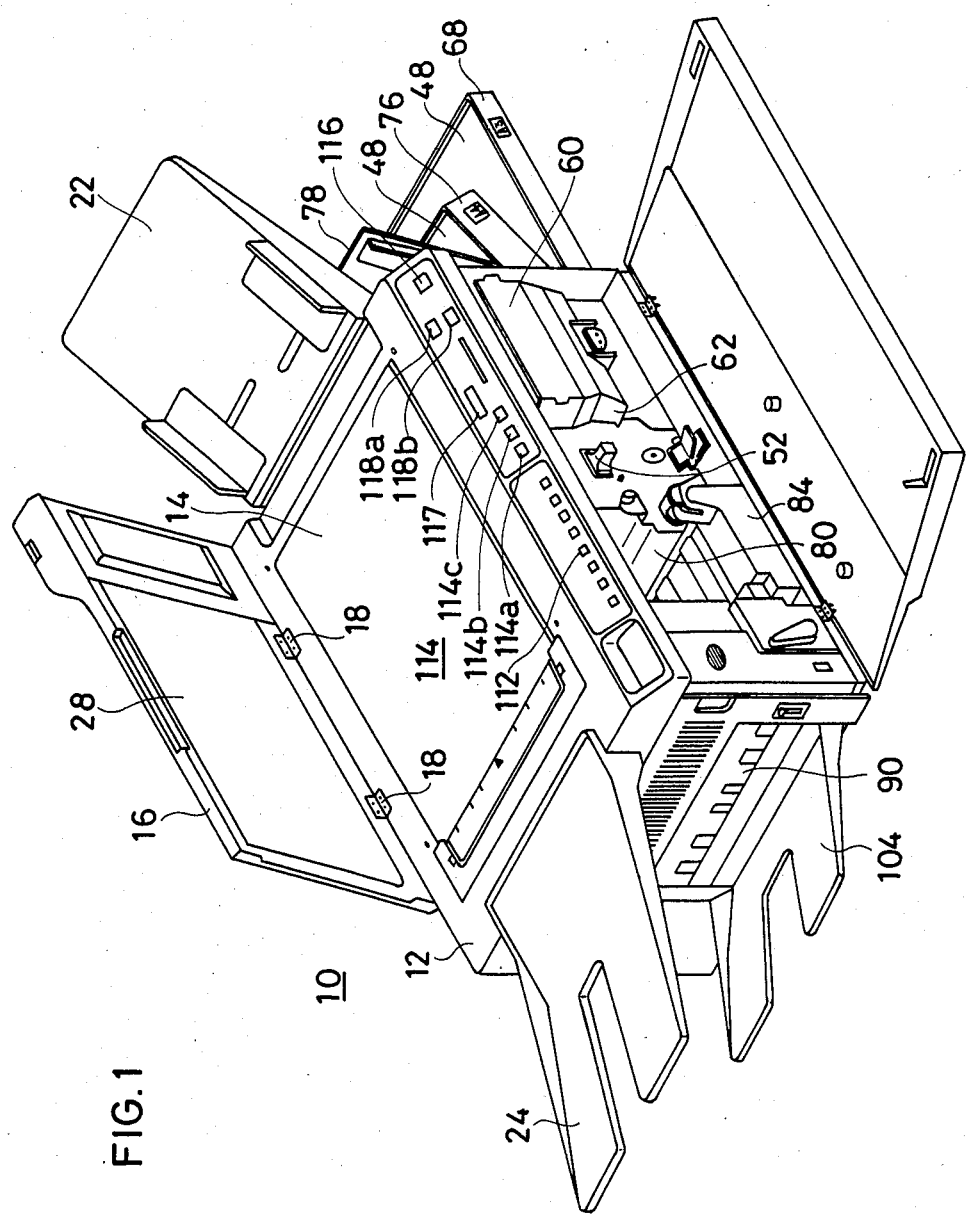
FIG. 1 is a perspective view showing an electrophotographic copying machine as one embodiment of the present invention.
Figure 2:
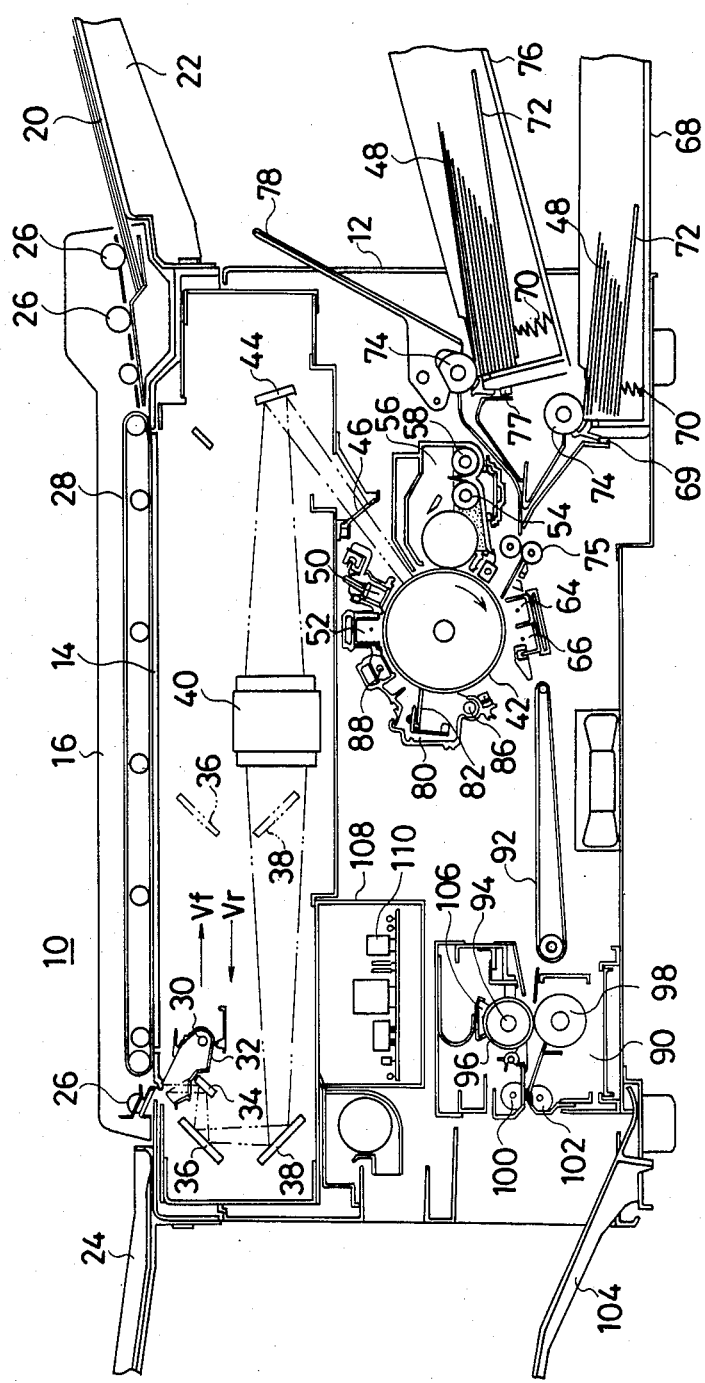
FIG. 2 is an illustrative sectional view for explaining an internal structure of FIG. 1.

FIG. 1 is a perspective view showing an electrophotographic copying machine as one embodiment in accordance with the present invention, and FIG. 2 is a cross-sectional illustrative view for explaining the inner structure thereof. Hereinafter, the present invention is described as an application to an electrophotographic copying machine, and it is pointed out in advance that the present invention can be applied also to image forming apparatuses other than such an electrophotographic copying machine, for example, the facsimile and the like.

In reference to FIG. 1 and FIG. 2, an electrophotographic copying machine 10 includes a copying machine main body 12, and on the top surface of this copying machine main body 12, an original table 14 composed of a transparent glass plate is installed in a fixed fashion. On the upper part of this original table 14, an automatic document feeder 16 is mounted by means of hinges 18 at the side end thereof. At the leading end side of this automatic document feeder 16, an original placing table 22 whereon originals 20 before copying are stocked is provided, and at the trailing end side of the automatic document feeder 16, a tray 24 receiving originals after copying is provided. The automatic document feeder 16 includes a plurality of rollers 26, 26 . . . and an endless belt 28 for picking up and carrying the originals 20 placed on the original placing table 22.

Under the original table 14 in the copying machine main body 12, a light source 30 as a scanning means for exposing and scanning the original is installed, and this light source 30 is made movable from one end side to the other end side of the original table 14 and in the reverse direction thereto. Then, the movement in the right-left direction of this light source 30 is achieved by driving by means of a servo motor (not illustrated). Associated with the light source 30, a reflecting mirror 32 having elliptic cross-section is provided. A first movable mirror 34 is fixed to this reflecting mirror 32. When the light source 30 goes in the right direction in FIG. 2 by means of the servo motor, the original placed on the original table 14 is exposed through a slit, and such an exposure is not performed when the light source 30 returns in the left direction in FIG. 2. In FIG. 2, the moving speed of the light source 30 at forward going motion is represented as "Vf", and the moving speed at returning motion is represented as "Vr".

Associated with the first movable mirror 34, a second movable mirror is provided, and this second movable mirror comprises a pair of movable mirrors 36 and 38. This pair of movable mirrors 36 and 38 are for reflecting again the original image reflected by the first movable mirror 34 toward an image-forming lens 40. These second movable mirrors 36 and 38 can be moved in the same direction as that of this light source 30 at a speed of ½ of the moving speed of the light source 30, namely, Vf/2 or Vr/2. Meanwhile, the image-forming lens 40 is constituted with a zoom lens, and accordingly, the electrophotographic copying machine of the present embodiment can change the copy magnification.

In front of the image-forming lens 40, a fixed reflecting mirror 44 for reflecting the original image transmitted through the lens 40 toward a photosensitive drum 42 is installed. And, an infrared absorbing filter 46 is inserted between this fixed reflecting mirror 44 and the photosensitive drum 42.

A side erase lamp 50 is provided at an upstream side of the exposure position of the photosensitive drum 42, that is, the position where the original image is produced by the reflecting mirror 44, and this side erase lamp 50 is for removing charges on the portion corresponding to the side edge part of the copy paper on the photosensitive drum 42. At a further upstream side of this side erase lamp 50, a charging corotron 52 for uniformly accumulating charges of a specific polarity on the photosensitive drum 42 is installed.

A developing apparatus 56 is installed at a downstream side of the above-mentioned exposure position of the photosensitive drum 42, and an electrostatic latent image formed on this photosensitive drum 42 by the charging corotron 52, the light source 30 and the image-forming lens 40 is developed by this developing apparatus 56. The developing apparatus 56 includes a toner container 60 (FIG. 1) for feeding a toner, and associated with this toner container 60, the developing apparatus 56 further includes screw conveyors 54 and 58. These screw conveyors 54 and 58 are for stirring a carrier and the toner. Meanwhile, the toner container 60 is mounted in a manner that it can swing back and forth with a supporting axis 62 (FIG. 1) acting as a fulcrum.

At one side end of the copying machine main body 12, a paper feeding part is formed, and in this paper feeding part, in the present embodiment, two paper feeding cassettes 68 and 76 are loaded in a freely attachable/detachable fashion. In the paper feeding cassette 68, for example, papers 48 of A3 size are stacked, and in the other paper feeding cassette 76, for example, papers 48 of A4 size are stacked. A compression spring 70 and a supporting plate 72 for pushing the stacked papers 48 upward are provided in the inner bottom part of respective paper feeding cassettes 68 and 76. A paper at the top of papers stacked in the paper feeding cassette 6B or 76 is pressed against a paper feeding roller 74 by this spring 70 and the supporting plate 72. The paper feeding roller 74 takes the paper 48 thus pressed one by one in sequence onto a register roller 75 from this paper feeding cassette 68 or 76 by means of rotation thereof. In the present embodiment, a manual paper feeding table 78 is further provided in the paper feeding part, and when this manual paper feeding table 78 is rotated clockwise from a state as shown in FIG. 2 to become a nearly horizontal state, a manual paper feeding can be performed.

Cassette sensors 69 and 77 which can detect the presence of the paper feeding cassettes 68 and 76 in a loaded state are provided, respectively. These cassette sensors 69 and 77 respectively include, for example, a microswitch whose actuator is actuated by the paper feeding cassette 68 or 76 in a state loaded in the main body 12.

At the downstream side of the developing apparatus 56, a transferring corotron 64 and a separating corotron 66 are installed in an one-body fashion.

When the paper 48 is fed from the paper feeding cassette 68 or 76, that is, the paper feeding part, a toner image formed on the photosensitive drum 42 is transferred onto the paper 48 by the transferring corotron 64. In transferring by this transferring corotron 64, the paper is attracted to the drum 42, being likely to move together with this drum 42, but it is separated by the separating corotron 66, being carried toward a vacuum conveyor 92 as described later.

A cleaning apparatus 80 is provided at the downstream side (top left in FIG. 6) of the separating corotron 66 along the photosensitive drum 42, and this cleaning apparatus 80 removes the toner which is not transferred completely and remains on the photosensitive drum 42. This cleaning apparatus includes a rubber blade 82 for scraping the toner remaining on the photosensitive drum 42, and the remaining toner scraped off by this blade 82 is sent out to a waste toner container 84 by a screw conveyor 86.

Furthermore, at the upstream side of the cleaning apparatus 80, a charge-removing lamp 88 for removing the charges remaining on the photosensitive drum 42 is provided, and the above-mentioned charging corotron 52 is disposed at a further downstream side of this charge-removing lamp 88.

The paper separated from the photosensitive drum 42 by the separating corotron 66 is sent to a fixing apparatus 90 by the vacuum conveyor 92. This fixing apparatus 90 includes a heating roller 96 incorporating a heater 94 and a pressure roller 98 for pressure-contacting the paper with this heating roller 96. Accordingly, the toner image transferred on the paper 48 is heated and pressed by the two rollers 96 and 98, being fixed on the paper 48. The paper completing fixation is discharged on a discharged paper tray 104 by means of a pair of paper discharging rollers 100 and 102. In addition, associated with the heating roller 96, and oil supplying part 106 is provided for supplying to the roller 96 with silicone oil.

A control box 108 is formed above the fixing apparatus 90 in the copying machine main body 12, and a component 110 for a control system as described later is provided in this control box 108.

As shown in FIG. 1, a ten-key 112 is provided on the key panel of the copying machine 10, and this ten-key 112 is used for setting the number of sheets to be copied. Magnification setting keys shown generally by a reference numeral 114 are provided on the key panel and in the embodiment, these magnification setting keys 114 include a magnification key 144a, a reduction key 114b and a full-size key 144c. When the full-size key 114c is operated, "1.0" is set for the copy magnification (m). When the magnification key 114a is operated various copy magnifications corresponding to the number of operations thereof, for example, "m=1.154", . . . , "m=1.414" may be set. When the reduction key 114b is operated, various magifications corresponding to the number of operations thereof, for example, "m=0.647,". . . , "m=0.930" can be set. Magnifications which are set in such a manner can be visibly displayed by a display 117. A start key 116 provided on the key panel is used for instructing a copy start. Further, selection keys 118a and 118b for selecting the paper sizes, namely, the paper cassettes are provided on the key panel. When the cassette selection key 118a is pressed, for example, the upper paper cassette 76 (FIG. 1) can be selected and when the selection key 118b is pressed, the lower paper cassette 68 can be selected. Accordingly, an either of paper sizes "A4", "B4" or "A3" may be selectively set by these selection keys 118a or 118b.

Figure 3:
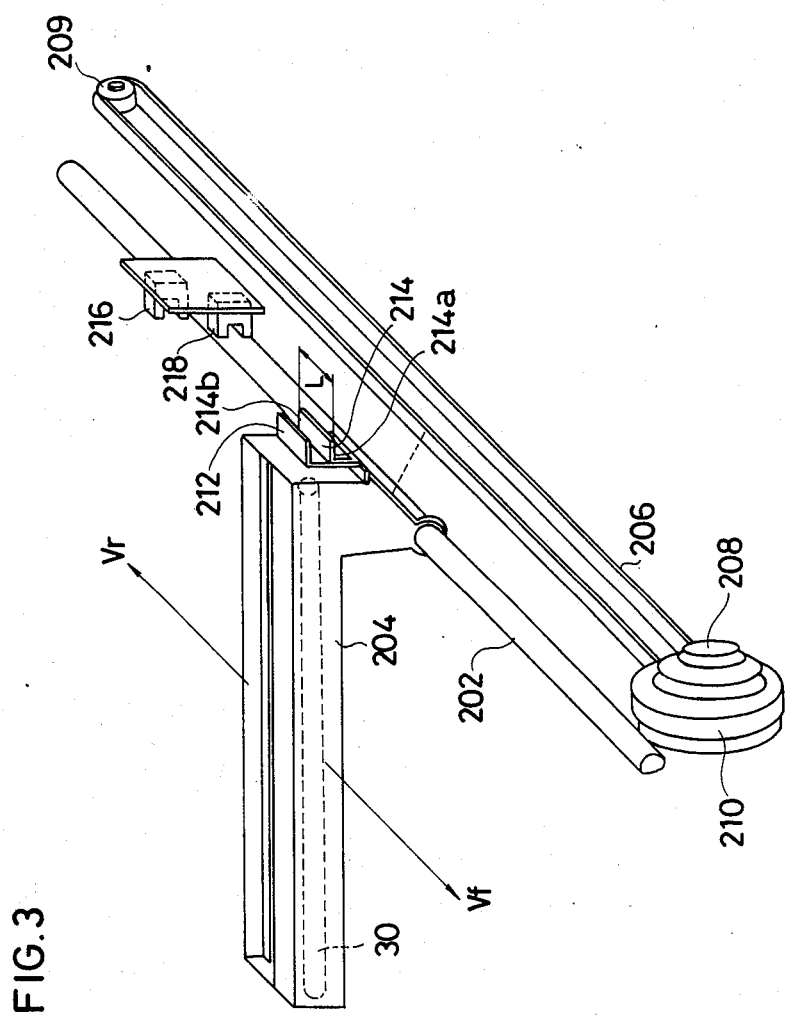
FIG. 3 is a perspective view showing a major portion of the embodiment.

FIG. 3 is a perspective view showing a major portion of the embodiment of the present invention. A guide bar 202 is provided in a body 12 (FIGS. 1 and 2) under an original table 14. The guide bar 202 having both ends thereof being fixed to the body 12 extends in parallel with the moving direction of an exposure lamp 30. A carriage 204 is supported by the guide bar 202 slidably thereto. The carriage 204 supports the exposure lamp 30, accordingly, when the carriage 204 slides along the guide bar 202, the original is scanned and exposed by the exposure lamp 30. A belt 206 is used for moving the carriage in such a manner. More specifically, the belt 206 is arranged between the rotation axis of a DC servomotor 210 and an idler 209 disposed rotatably on the body 12, wherein a part of the belt 206 is connected to the carriage 204 by an appropriate connecting means (not shown) as shown by dotted lines in FIG. 3. Accordingly, when the DC servomotor is actuated, the belt 206 displaces and the carriage 204 fixed thereto is moved toward the direction shown by the arrow. Meanwhile, reflecting 32 a first movable mirror 34 are provided in relation with the exposure lamp 30 as described before. On one longitudinal end of the carriage 204, two shield plates 212 and 214 as members to be detected are provided in projection . These shield plates 212 and 214 may be detected by a photointerrupter to be described later by crossing an optical axis thereof.

The photointerrupters 216 and 218 are disposed fixedly on the path of the carriage 204, i.e. shield plates 212 and 214 by securing, for example, to the body 12 (FIGS. 1 and 2). The first photointerrupter 216 is disposed at the starting position of the forward going of the exposure lamp 30, that is, a home position (HP) of the carriage 204, and a second photointerrupter 218 is disposed at the starting position of the original exposure to a moving direction of the carriage 204 from the home position, that is, the starting position of the original exposure (IP).

Figure 4:
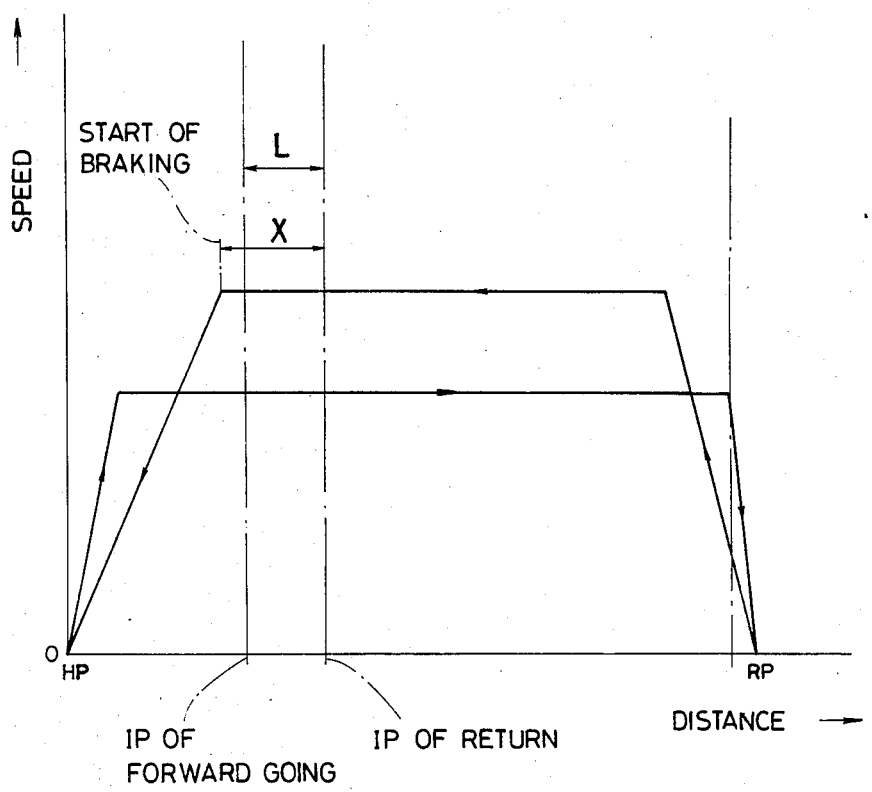
FIG. 4 is a graph for explaining a principle of the embodiment wherein a distance or a position is indicated on the abscissa and a speed is indicated on the ordinate.

Referring to FIG. 4, the carriage 204, i.e. the exposure lamp 30 is standing still at the home position (HP) as the initial state thereof. Accordingly, at this state, the shield plate 212 is shielding the first photointerrupter 216. When an operator operates the start key 116 (FIG. 1), the DC servomotor 210 is driven and the carriage 204 starts moving toward the direction of the arrow Vf in FIG. 3 and simultaneously the exposure lamp 30 is lit. Thereafter, when a leading edge of the shield plate 214 shields the second photointerrupter 218, the exposing and scanning starts from the tip of the original as the exposure lamp 30 has arrived at the starting position of the original exposure. A signal from the photointerrupter 218 of the guide bar 202 is used as a base signal of the timing for feeding paper from a register roller 75 (FIG. 2) in order to set coincidentally the initial position of the original exposure, i.e. the tip of the original to the tip of the copy paper.

Such a forward going of the carriage 204 will be continued as far as the distance or during the time decided in accordance with paper sizes and/or magnifications (m). A rotary encoder 208 is used for detecting the forward going distance. More specifically, data for the forward going distance corresponding to the paper size and/or magnification set by the operator will be read out, for example, from the ROM and fed to a motor controller to be described later. On the other hand, the motor controller counts the pulse from the rotary encoder 208 and sends a signal to the CPU to be described later when detecting that the carriage 204, i.e. the exposure lamp 30 has moved by the distance corresponding to the distance data provided thereto. Accordingly, the CPU gives an instruction or a signal for braking the DC servomotor 210 to the motor controller. Therefore, as soon as the exposure lamp 30 is turned off, and the carriage 204 starts returning toward the direction of the arrow Vr in FIG. 3 from a starting position of the returning movement (RP) in FIG. 4.

During the returning movement of the carriage 204, a trailing edge 214b of the shield plate 214 shields the second photointerrupter 218. In response to the signal, a signal is given from the second photointerrupter 218 and the CPU (not shown) controls the braking position by feeding the data previously read out to the motor controller. In the embodiment, as shown in FIG. 4, the braking starts during the returning movement of the carriage 204 after the movement has continued by the distance X after the second photointerrupter 218 has been shielded. Thereafter, the carriage 204, i.e. the exposure lamp 30 is stopped at the home position (HP).

Meanwhile, since the shield plate 214 has a length L in a direction parallel to the moving direction of the exposure lamp 30, the second photointerrupter 218 is shielded during the returning movement at a position separated by the distance L from the starting position of the original exposure (IP) or the timing when compared with the forward movement. Accordingly, in the embodiment, the starting positions of the original exposure during the forward movement and the braking during the return movement can be detected by one sensor, i.e. by the second photointerrupter 218. Accordingly, a configuration may be simplified.

However, it does not necessarily follow that the second photointerrupter 218 should be used commonly for detecting the starting positions of the original exposure and the braking during the return movement and it goes without saying that each separate sensor, for example, photointerrupters can be used.

Moreover, in the embodiment, since the returning speed Vr of the exposure lamp 30 varies in accordance with the copy sizes, i.e. paper sizes and/or magnifications, the distance X described above is changed accordingly. Relations between the paper sizes and distances X are shown in the following Table I and that of the magnifications and distances X are shown in the following Table II respectively.

TABLE I

| Paper Size (m = 1.0) | Distance X (mm) |
| --- | --- |
| A4 width | 35 |
| A4 length | 32 |
| B4 | 28 |
| A3 | 28 |

TABLE II

| Magnifications (m) | Distance X (mm) |
| --- | --- |
| 0.647 | 39 |
| 0.707 | 38 |
| 0.750 | 38 |
| 0.786 | 37 |
| 0.816 | 35 |
| 0.866 | 35 |
| 0.930 | 32 |
| 1.152 | 25 |
| 1.210 | 24 |
| 1.224 | 24 |
| 1.270 | 23 |
| 1.414 | 21 |

As it is apparent from Tables I and II, the larger the paper sizes or the magnifications, the shorter the distances X. This is for controlling the impact and vibration at the standstill by elongating the braking distance by starting the braking at the earlier timing since the returning speed of the exposure lamp 30, i.e. the carriage 204 increases in such cases.

Further, the smaller the copy sizes, i.e. the paper sizes and magnifications, the slower the returning speed of the exposure lamp, accordingly the copying efficiency can be improved by shortening the braking distance by starting the braking at the later timing. In this case, since the returning speed is slow, the impact and vibration at the standstill is little even at the short braking distance.

Meanwhile, to change the returning speed corresponding to paper sizes and/or copy magnifications is disclosed in a co-pending U.S. patent application Ser. No. 691,277, filed Jan. 14, 1985, now U.S. Pat. No. 4,564,288 assigned to the same assignee of the present invention, so the detailed description thereof will be omitted.

Figure 5:
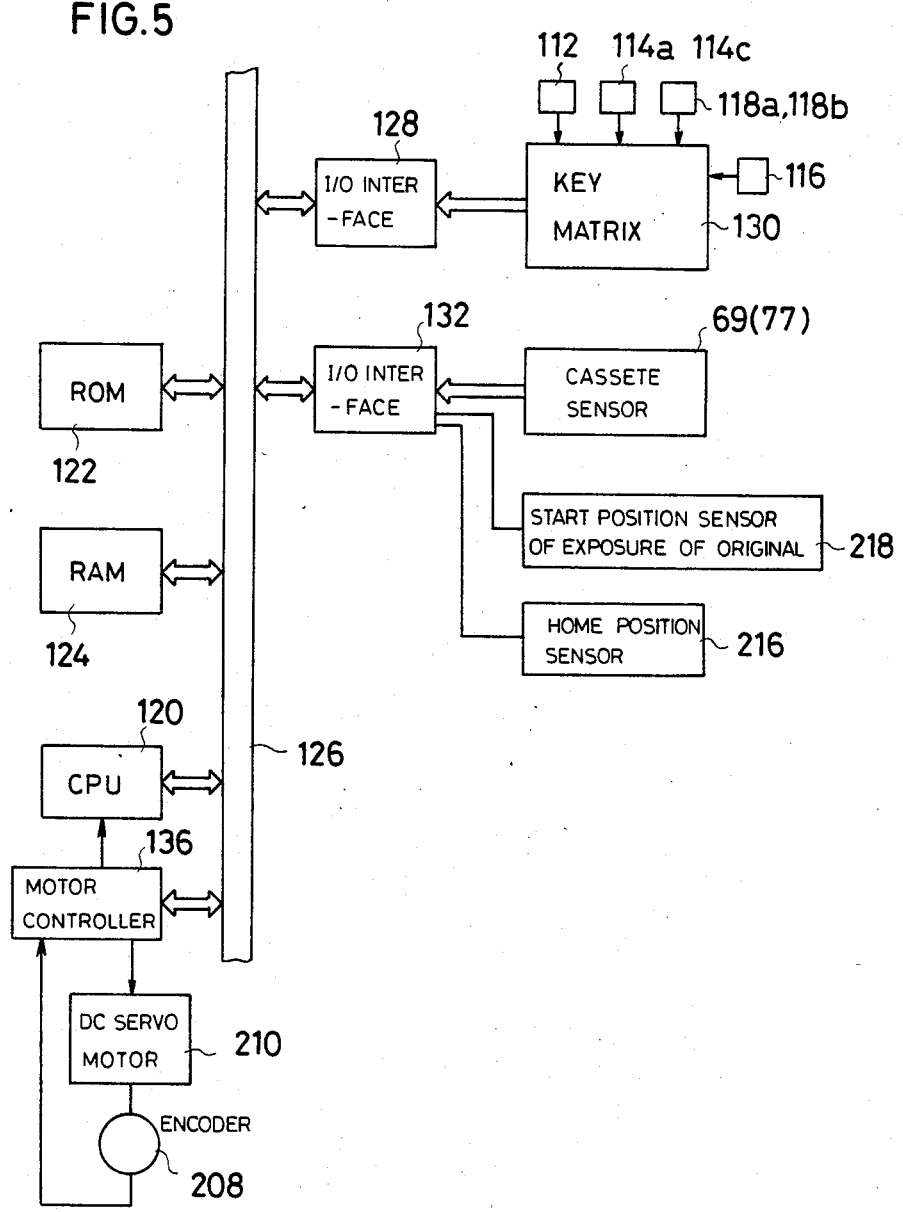
FIG. 5 is a block diagram showing a control system of the electrophotographic copying machine shown in FIGS. 1 and 2.

FIG. 5 is a block diagram showing a schematic representation of a control system of the embodiment. A CPU 120, a ROM 122 and a RAM 124 are connected through a bus line 126 which includes an address bus, a data bus and a control bus. To the bus line 126, a key matrix 130 is connected via an I/O interface 128. The key matrix 130 is connected to respective keys 112, 114a–114c, 116, 118a and 118b on the key panel shown in FIG. 1 and provides a specified key code corresponding to the key in accordance with operating signals from respective keys. Cassette sensors 69 and 77 are also connected to the bus line 126 via an I/O interface 132. These cassette sensors 69 and 77 are provided at a paper feeding part as described above and detect the size of the cassette attached thereto, i.e. the size of paper. For example, when the cassette selection key 118a is operated the cassette sensor 77 is activated and a signal showing, for example, that a paper size of A4 has been selected is fed in from the I/O interface 132.

Two photointerrupters described above, i.e. a home position sensor 216 and an original exposure starting position sensor 218 via the I/O interface 132.

A motor controller 136 is also connected to the bus line 126. As the motor controller 136, for example, the integrated circuits "HL-101C" by Sanyo Electric Co., Ltd. is used and the DC servomotor 210 is connected thereto. The DC servomotor 210 is a motor for moving back and forth the movable member 204, i.e. the light source 30 and components associated therewith as described above. The motor controller 136 includes, for example, a gate array, and controls an applied voltage and time of the DC servomotor 210 according to the data for speed and moving distance read out from the ROM.

Data for the speed described above, i.e. the moving speed Vf, the returning speed Vr and the moving distance to be given to the motor controller 136 are stored in advance in the ROM 122. Such speed data can be changed, basically, in accordance with the paper size to be used, moreover, in case of the variable magnification copying machine as the embodiment, it can be changed according to the copy magnification. Furthermore, in the ROM 122, data related with the distance X shown in the previous Tables I and II are stored in each address in advance.

Meanwhile, the distance itself can be deemed as the data related to the prescribed distance X but also the data of time period may be used. Because, the distance is a function of the speed and time.

A rotary encoder 208 is connected to the DC servomotor 210 and generates the number of pulses corresponding to the rotation of the motor 210. These pulses are given to the motor controller 136. The motor controller 136 counts the pulses and provides a signal to the CPU 120 when the prescribed pulses number given by the ROM 122 is counted. The CPU 120 is able to recognize the moving distance of the movable member 204 by this signal. More specifically, when the movable member 204 is moved by the distance corresponding to the paper size and/or the copy magnification after receiving the output signal from the original exposure starting position sensor 218 as described, the motor controller 136 gives a count end signal to the CPU 120 which provides a signal for a reverse rotation of the motor 210 to the motor controller 136 and then the returning movement of the movable member 204 (FIG. 3) is started.

Figure 6:
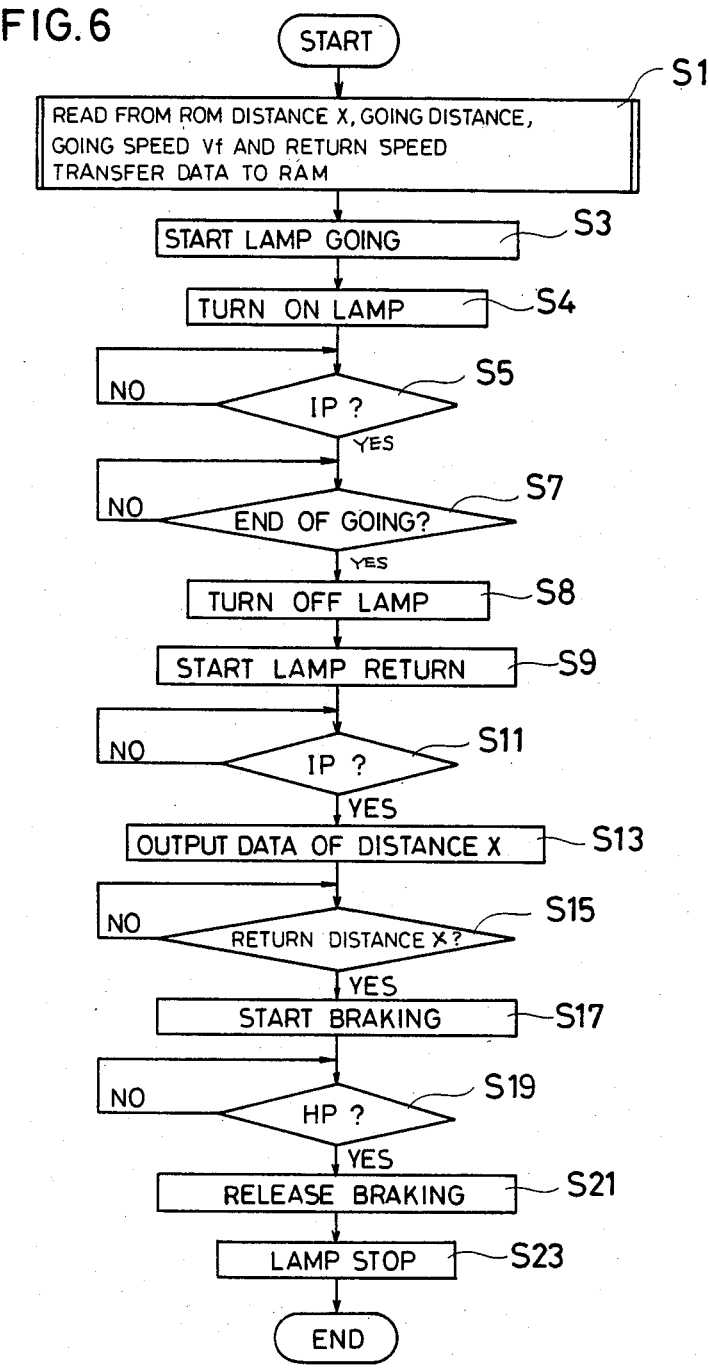
FIG. 6 is a flow diagram for explaining a control or an operation of the electrophotographic copying machine.

Next, referring to FIGS. 6 and 7, the control and operation of the present embodiment will be given in detail. A flow diagram shown in FIG. 6 starts when the copy start key 116 (FIG. 1) is pressed, but generally an operator has to operate other keys before pressing the start key 116. First, the operator will place an original to be copied on an original table 22. Then the operator will operate the cassette selection keys 118a or 118b for selecting the paper size corresponding to the original and the ten-key 112 for setting the number of sheets to be copied. In order to select a desired magnification either of the magnification set keys 114a–114c is operated. After completing these consecutive preparatory works the operator will press the start key 116.

When the start key 116 (FIG. 1) is pressed, the CPU 120 reads data for the magnification (m) and the paper size responding to the signal from the key matrix 130. Then at the first step S1 data corresponding to the magnification and paper size are set. A subroutine for such data setting is shown in FIG. 7. For example, when m=1.0 the CPU 120 decides whether the cassette selection key 118a is operated, namely, whether the required paper size is A4 according to the data from the I/O interface 132. If the cassette 76 is mounted and the size selection key 118a is operated, since the paper size of A4 has been selected, the CPU, at the next step, provides the address data of ROM wherein the data related to the distance X, forward going distance, forward going speed and returning speed for m=1.0 and size A4 are stored and reads these data from the ROM and stores in the predetermined areas of RAM 124. If the paper size is not A4, the CPU decides whether the size is B4, and if so provides the address data of the ROM 122 wherein the data related to the distance X, forward going distance, forward going speed and returning speed for m=1.0 and size B4 are stored and reads these data from the ROM and stores in the predetermined areas of RAM 124. If the size is not B4, then the CPU provides the address data of ROM 122, wherein the distance X, forward going distance, forward going speed and returning speed for m=1.0 and size A3 are stored and reads these data from the ROM and stores in the predetermined areas of RAM 124.

Further, in the subroutine for setting data, when m is not 1.0, the CPU 120, as shown in FIG. 7 judges respective magnifications and provides the address data of ROM 122 wherein the distance X, forward going distance, forward going speed and returning speed corresponding thereto are stored and reads these data from the ROM and stores in the predetermined areas of RAM 124.

It will be readily understood that, in such a manner, in the data setting subroutine in FIG. 7, the data related to the distance X in previous Tables I and II are stored in the predetermined areas of RAM 124.

Referring once more to FIG. 6, at the next step S3, the CPU 120 gives a speed data and a forward rotation instruction for the DC servomotor 210 to the motor controller 136. Accordingly, at this step S3, the carriage 204 (FIG. 3), i.e. the exposure lamp 30 starts forward going and at the next step S4, the CPU 120 lights the exposure lamp 30. Then, at the following step S5, when detecting a signal from the original exposure starting position sensor, i.e. the second photointerrupter 218, the CPU 120 gives the data for forward going distance stored in the predetermined area of RAM 124 to the motor controller 136. At the succeeding step S7, the CPU judges whether the forward going has ended based on the signal from the motor controller 136 which indicates the completion of forward going. Pulses from the encoder 208 are used for generating the signal in the motor controller 136 as described before.

When the completion of forward going is decided, at the next step S8, the exposure lamp 30 is turned off and at the succeeding step S9, the CPU 120 gives the speed data and reverse rotation instruction for the DC servomotor 210 to the motor controller 136. Accordingly, the returning movement of the exposure lamp 30, i.e. the carriage 204 is started. Then, at the next step S11, the CPU judges whether the second photointerrupter 218 has been shielded by the trailing edge 214 (FIG. 3) of the shield plate 214, namely, whether the carriage 204 has returned to the position (IP) during the returning movement. When the CPU 120 detects the signal from the photointerrupter 218 at the step S11, at the next step S13, reads the data from the RAM 124 wherein the data has been stored at the previous data setting subroutine S1 and outputs the data of distance X (referring Tables I and II) to the motor controller 136. The motor controller 136 detects the completion of movement by the distance X based on to the data related to distance X and the pulses from the rotary encoder 208 and provides the signal to the CPU 120. Accordingly, the CPU 120, at the next step S15, judges whether the returning movement by the distance X has completed after when a signal is outputted from the photointerrupter 218 based on the signal from the motor controller 136. If the completion of returning movement by the distance X is detected, the CPU 120, at the Step S17, gives the braking signal to the motor controller 136, accordingly the braking will be applied to the DC servomotor 210.

At the following step S19, the CPU 120 judges whether decides if the carriage 204, i.e. the exposure lamp 30 has arrived at the home position (HP). This can be decided by the home position sensor, namely, the output from the first photointerrupter 216. If the carriage 204 has arrived at the home position, the CPU 120 gives the instruction signal for releasing the braking to the motor controller 136, accordingly, at the step S21, the braking is released and the exposure lamp 30, at the step 23, stops at the home position thereof.

Meanwhile, in the above embodiment, the electrophotographic copying machine whereby the copy magnification can be varied in the stepwise manner has been described. However, it goes without saying that the present invention is applicable to those having continuously variable magnifications. In this case, for example, the data related to the distance X may be stored in advance in the ROM corresponding to the variations of every one percent of the magnification.

Moreover, in the above embodiment, the electrophotographic copying machine whereby the light source is moved for exposing and scanning the original has been described. However, the present invention may be applied also the original table moving type, wherein the original, i.e. the original table is constituted movably while the light source is fixed. In this case, the original table or the member (not shown) associated therewith functions as the movable member and the DC servomotor 210 may be used for moving such original table, i.e. the movable member.

Further, in the above embodiment, the photointerrupter was used as the detecting means. However, as the detecting means, other contact type switches, for example, microswitch or the like and non-contact type switch, for example, magnetic sensors or the like are also applicable.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for scanning an original comprising:
   an original table for placing an original,
   a light source for exposing the original placed on said original table,
   a movable member which is moved correspondingly to relative movement between said original table and said light source and is reciprocatingly movable in a forward direction from a home position to a start return position and in a return direction from the start return position to the home position,
   detecting means disposed in the path of movement of said movable member for detecting an intermediate position of the movable member, the intermediate position being situated between the home and start return positions, the detecting means providing an output signal indicating when the movable member is in the intermediate position,
   means for effecting movement of said movable member in the return direction over a predetermined distance measured from the intermediate position in the return direction of movement and in response to the output signal from said detecting means,
   braking means for braking the movement of said movable member after the member has moved over said predetermined distance, and
   data setting means for setting data related to said predetermined distance, wherein said data setting means changes said predetermined distance according to the speed at which said movable member moves in the return direction.

2. An apparatus for scanning an original in accordance with claim 1, wherein said data setting means sets said predetermined distance shorter with an increased returning speed of said movable member.

3. An apparatus for scanning an original in accordance with claim 1, which further comprises a home position detecting means for detecting when the movable member is in the home position, and wherein said detecting means is disposed in the vicinity of said home position detecting means.

4. An apparatus for scanning an original in accordance with claim 3, which further comprises means for detecting an edge of the original based on the output signal of said detecting means during movement of said movable member in the forward direction.

5. An apparatus for scanning an original comprising:
   an original table for placing an original,
   a light source for exposing the original placed on said original table,
   a movable member which is moved correspondingly to relative movement between said original table and said light source and is reciprocatingly movable in a forward direction from a home position to a start return position and in a return direction from the start return position to the home position,
   a home position detecting means for detecting when the movable member is in the home position,
   detecting means for detecting when said movable member is in an intermediate position, the detecting means being disposed in the vicinity of said home position detecting means,
   means for detecting an edge of the original based on an output signal of said detecting means during movement of the movable member in the forward direction, and
   means for controlling a starting position of braking of said movable member in response to the output signal of said detecting means during movement of said movable member in the return direction.

6. An apparatus for scanning an original in accordance with claim 5, wherein said detecting means includes a photointerrupter and further comprises a shield plate disposed on said movable member for shielding a light axis of said photointerrupter.

7. An apparatus for scanning an original in accordance with claim 6, wherein said shield plate includes leading and trailing edges separated by a certain distance, wherein
   said means for detecting the edge of said original being responsive to the detection of said leading edge of said shield plate by said photointerrupter, and wherein
   said means for controlling said starting position of braking being responsive to the detection of said trailing edge of said shield plate by said photointerrupter.

* * * * *